Patented Jan. 14, 1936

2,027,378

UNITED STATES PATENT OFFICE 2,027,378

METHOD OF CONVERTING ALCOHOLS TO ACIDS

William J. Hale, Midland, Mich.

No Drawing. Application November 9, 1931, Serial No. 574,033

27 Claims. (Cl. 260—116)

The present invention relates to the production of organic acids.

In the past acetic acid has been prepared from ethyl alcohol by the two-stage process, involving the dehydrogenation of alcohol into acetaldehyde and hydrogen by metal catalysts, and the oxidation of these products into acetic acid and water respectively, through the agency of an oxygen-supplying material such as copper oxide. In this type of process a most careful control of heat transfer is required, in that dehydrogenation of the alcohol is endothermic and the concomitant union of the resulting products, acetaldehyde and hydrogen, with oxygen supply is exothermic. Only by use of water vapor in the system can a thorough control be achieved. At the same time, this water vapor exerts a beneficial effect in that it represses any tendency of the aldehyde under formation to undergo polymerization or other intramolecular condensation. Further, the tendency of finely divided metals, such as copper, to decompose aldehyde or acid into hydrocarbons and carbon oxides at or above 260° C. is so repressed by water vapor that this effect is scarely discernible below 350° C.

In view of the above it has become the practice heretofore to maintain a rather large excess of water vapor in the oxidation of primary alcohols into their corresponding acids, especially by reason of the generally preferred temperature of operation as between 320 and 340° C. This excess of water vapor taken together with water produced in the process, through oxidation of liberated hydrogen, has lead of course to a highly diluted acid in the end product and consequently to additional expense in production of a concentrated acid for commercial purposes.

The present invention introduces a group of reactions in organic chemical equilibria involving the dehydrogenation of primary alcohols and the immediately subsequent hydration of resulting aldehydes into aldehydrols, with final dehydrogenation of the latter into the corresponding acids; the end result being exactly equivalent to a direct oxidation of original alcohol by oxygen, but with the added feature of no water actually produced in the system.

As described in my copending application Serial No. 571,281, of which the present invention is a continuation in part, an aldehyde may be converted by a novel type of reaction to its corresponding acid. This new method of attack makes use of no metallic oxides whatsoever as sources of oxygen. The invention involves the use only of oxygen contained in water as its oxidizing material and this is made available by the dehydrogenation of combined water in situ.

Briefly considered, the present invention correlates the essential factors of the aldehydic conversion, described in the copending application referred to, with the dehydrogenation of a primary alcohol in a novel unitary process of continuous conversion of alcohol to acid. The process is particularly characterized by very low thermal conditions of conversion and the absence of free or readily available oxygen.

It has been found, as set forth fully in my earlier application above referred to, that by a proper choice of catalysts and by controlling temperature conditions at a relatively low value, aldehydes may be converted to acids by effecting the hydration of the aldehyde to its corresponding aldehydrol and then dehydrogenating the aldehydrol to obtain the corresponding acid.

The efficacy of this treatment depends in a considerable measure upon the employment of the proper catalyst. As pointed out in the prior application, if proper directive catalysts are employed, a simple method of conversion resulting in satisfactory yields is obtained. The catalysts employed are termed "directive catalysts" and comprise generally the partially hydrolyzable salts of an amphoteric base with the desired organic acid or a homologue thereof.

It has now been found that these directive catalysts function admirably and efficiently in a continuous process involving the conversion of alcohol to acid. The present invention involves the additional step of dehydrogenating alcohol to form the aldehyde. This dehydrogenation is happily effected by the same dehydrogenative catalysts which already are included in the catalytic mass. The essential steps, therefore, effected by the present treatment are the dehydrogenation of alcohol to form an aldehyde, then the hydration of this aldehyde to an aldehydrol and the final dehydrogenation of the aldehydrol to form the corresponding acid.

As has been described fully in the copending application referred to, aldehydes may be converted to acids without utilizing oxygen or the ordinary oxygen yielding substances. This process of conversion involves the addition of the elements of water to the carbonyl group and then the subsequent removal of two hydrogen atoms from the hydrated aldehyde. As a result of experimentation it was found that special types of catalysts are required for this reaction. Metallic copper operated very effectively as the dehydrogenative catalyst. For this function silver, zinc, palladium and the platinum metals are also effective. However other well known dehydrogenative catalysts such as manganous oxide and other metal oxides, are not efficient under the low temperature conditions of the process.

It was found also that the well known hydrative catalysts in general would not operate, and unexpectedly, even those which combine the properties of dehydrogenation as well as hydration. In addition it was further discovered that alkalies and alkaline earth metal hydroxides are totally unsuited in the process. It was found that catalysts of a certain type are required. It ultimately developed that those elements which form amphoteric hydroxides are particularly useful in the process but of these only those which are able to form basic salts with the organic acids in question, under the conditions of the operation, are serviceable. And finally it was ascertained that only those elements giving rise to amphoteric hydroxides and capable of forming basic salts, which salts resist complete hydrolysis under the action of water at 350° C., serve effectively for the conversion of aldehyde into its corresponding acid.

Inasmuch as these substances exert a direct influence upon the conversion they are termed directive catalysts. These directive catalysts to be effective, however, must be employed with a dehydrogenative catalyst.

It was found that but relatively few metals satisfy the requirements for the directive catalysts. With respect to the periodic system, these elements are as follows: Group 1, copper; Group 2, beryllium, magnesium and zinc; Group 3, aluminum; Group 4, zirconium and the cerium metals; Group 6, chromium; Group 7, manganese; Group 8, iron and cobalt. In the 8th group the basic salts of nickel were found to function at low temperatures but exhibited a decided tendency toward carbon dioxide formation, and for this reason are not satisfactory. The basic salts of iron and cobalt as well as copper and zinc are limited to relatively low operating temperatures owing to the high concentration of free hydrogen obtaining, under which at higher temperatures these salts are reduced to the metallic state.

It was further found, in defining the optimum conditions of conversion of aldehyde to acid, that it is advantageous to employ a metallic mass rich in dehydrogenative catalysts and containing two or more of the directive catalysts associated therewith. The hydrative effect of the majority of our directive catalytic bases contributes to the ready hydrative activity of the mass.

The catalytic mass utilized in the conversion of aldehyde to acid therefore serves very effectively for the present invention, namely for the conversion of alcohol to acids. The present process essentially comprises the removal of hydrogen from the carbinol group; the hydration of the thus formed carbonyl and the subsequent dehydrogenation of the carbon hydroxide to form the carboxyl group.

It has been found that the dehydrogenation of alcohol is very readily effected by the dehydrogenative catalysts already comprehended in the mass; that is to say the dehydrogenation of alcohol proceeds most readily under the action of metallic copper. Similarly silver, zinc, palladium and the platinum metals, either singly or together, likewise subserve the double function of dehydrogenating the alcohol and also dehydrogenating the aldehydrate to the acid.

According to the present invention, therefore, use is made of the catalysts and conditions of the prior process referred to in which a primary alcohol is employed as the starting material in lieu of the aldehyde. The directive catalysts, as hereinbefore described, function as effectively as in the prior process. The additional step of converting the alcohol to the aldehyde merely involves the removal of hydrogen from the alcohol molecule before it can be utilized in the hydration step and then finally in the dehydrogenation step. In carrying out the present process utilizing the described catalytic mass and without employing any free oxygen supplying material, 2 molecules of hydrogen are liberated in the system for each molecule of alcohol employed. By reason of this double quantity of hydrogen liberated in the system, it becomes necessary that proper provision be made for its withdrawal through a porous membrane of some type. If this rather large excess of hydrogen is not so removed at the point of production, the undesired reducing effect of the hydrogen on the acid will be marked.

As noted above, the catalytic mass chosen for the conversion of the primary alcohol to the corresponding acid differs in no way from the conversion of aldehyde to acid. The added service of splitting off the hydrogen from the alcohol is the function of the metallic copper, or equivalent dehydrogenative catalyst already chosen and incorporated in the catalytic mass itself.

The optimum temperature of the operation is likewise the same as in the conversion of aldehyde to acid, namely 260 to 280° C. preferably, though in some cases the temperature can be considerably dropped and may be maintained as low as 150° C. However, as the dehydrogenation step is distinctly endothermic, it is advisable that the temperature of the forepart or influx side of the conversion apparatus or reaction chamber be maintained at slightly higher temperature than the remainder of the apparatus. While in most cases temperature ranges of between 260 and 280° C. are considered optimum, operations may be carried out at higher temperatures. However, it is found that it is advisable to maintain the temperatures below 350° because above this point undesired results obtain.

The continuous operation involving, as noted, the conversion of alcohol to aldehyde and the transformation of the aldehyde to the acid may be illustrated by a set of five equations which depict the state of equilibria at definite and successive stages in the operation. The directive catalyst basic manganous acetate is here given as an example of the catalyst employed:

I. $CH_3 \cdot CH_2OH \rightleftharpoons CH_3 \cdot CHO + H_2$

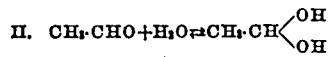

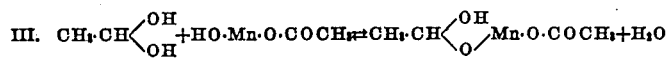

In summation of the five sets of equilibria, it will be observed that 1 molecule of alcohol and 2 molecules of water are balanced against 1 molecule of acid, 1 molecule of water and 2 molecules of hydrogen which, reduced to a minimum, indicates that for a theoretical conversion of 100%, 1 mol. of alcohol and 1 mol. of water must enter the system and from their interaction will be obtained 1 mol. of acid and 2 mols. of hydrogen. When these several sets of equilibria are instituted at one and the same time, and the period of contacting vapors with the catalytic mass reduced to the shortest possible time, then a degree of concentration of acetic acid is attained which approaches glacial. However, in actual operation such results are not completely accomplishable, especially when it is remembered that without some water vapor present decomposition of the end products themselves is likely to ensue. By means of a porous tube of sillimanite, or other suitable material selectively permeable to hydrogen, use of which permits the removal of the hydrogen from the catalytic mass in contact with the tube, it has been found possible to remove as much as 90% of the hydrogen liberated. This consequently has brought the concentration of acetic acid up to between 80 and 90%.

The present invention therefore provides a method of converting a diluted primary alcohol into its corresponding acid, approaching glacial concentration, and this without the employment of any oxygen supplying material.

The theoretical discussion of the factors involved in the course of complete change of aldehyde to aldehydrol and finally to acid has been presented in extenso in the copending application. As noted above, the present invention involves the preliminary conversion of alcohol to aldehyde, utilizing catalysts already contained in the mass. The invention is applicable to the conversion of all primary alcohols that are vaporizable under approximately 360° C. Thus, in addition, the methyl alcohol molecule, propyl alcohol molecule, butyl alcohol molecule and benzyl alcohol molecule, all have been found to be readily convertible by the present invention in yielding respectively formic acid, propionic acid, butyric acid and benzoic acid. Furthermore, any derivatives of these acids and higher homologues of the same act similarly.

During operation the dehydrogenative activity of the catalyst is maintained at a high efficiency throughout the mass and for great length of time without any attention whatsoever. If at times it becomes necessary to revivify the catalytic mass, resort need only be made to the intake of small amounts of air into the reaction zone when slight superficial oxidation of metal surfaces will be accomplished and this will be followed immediately thereafter by reduction to highly activated form by the incoming alcoholic or aldehydic vapors.

A possible interpretation of the mechanics of the reaction betwen the basic manganous acetate (or similar salt) and the aldehyde, for example, is illustrated by the following equation:

tween alcohol and acetic acid, nevertheless its great concentration in the reaction zone will considerably favor its interaction with the weak directive catalytic bases, such as hydroxy manganous acetate. A likely result of this interaction is the formation of a manganous aldehydrate-acetate. Such type of compound is readily hydrolyzed into its original components as the aldehyde and water pass over the basic manganous acetate and even when a quantity of free acetic acid accompanies the incoming vapors. The action of water therefore operates to prevent the actual building up of the manganous aldehydrate-acetate in a system of hydrative action only.

The basic salts of the acid in question may, as noted above, be considered the directive catalysts in this invention. Alone or together they fail to function to capacity. When, however, they are associated with the dehydrogenative catalysts, such as those mentioned, the entire series of equilibria comes into action. As an aid to the hydrative effect required, it has been found advisable to add, at times, a very small quantity of some of the well known strictly hydrative catalysts, and usually in the form of their oxides. Typical examples of these are titanium oxide, vanadium oxide and thorium oxide.

Furthermore, certain insoluble salts of the non-volatile inorganic acids, such as boric or phosphoric, both well known as hydrative acids, either with the hydrative oxide catalysts, or with the directive bases, will be found of service; such salts are cobalt borate, manganous borate, aluminum phosphate, chromium phosphate, and so forth. It is to be noted, however, that such insoluble salts of the directive catalytic bases cannot function as extensively in uniting with the aldehydrol concerned as where an organic acid radicle constitutes the acid portion of the salt is at hand, either the one corresponding to the aldehydrol or a related one. This divergence may be due primarily to the difference in solubility of the aldehydrol in the basic inorganic acid salt on the one hand, and the basic organic salt on the other. But in the end it is found that the structure of this basic inorganic salt per molecule does not permit of as many free basic hydroxyl groups for interaction with the oncoming aldehydrol as can be obtained with the basic organic salt. For a necessary successful operation of this process a certain concentration of organic acid radical in the salt must obtain and be in equilibrium between the water and free acid in the system.

Thus, use of basic manganous borate in connection with the dehydrogenative catalyst copper is found to give not more than ½ the quantity of acetic acid from alcohol in unit time, as when the equivalent quantity of basic manganous acetate and copper is employed. It appears that we have here to deal with an intermediate compound between a hydrated aldehyde molecule on the one hand and an acid molecule on the other, and in which an amphoteric electrolyte is interposed as a combining agent. Any of the directive catalysts must possess the property of cou-

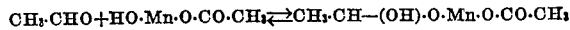

or

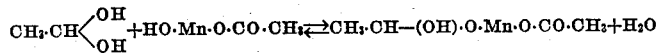

Now although the acetaldehydrol possesses but weakly acidic properties, which is midway bepling with the aldehydrol concerned to yield this intermediate compound and, as is often the case, mixtures of the catalysts are sometimes more serviceable than an individual catalyst.

It should be remembered in this connection that no additional hydrative agent beyond that supplied by the directive catalysts themselves need here be employed when lower membered primary alcohols are concerned. The aldehydes arising from these lower alcohols of the aliphatic series possess the property of immediate hydration simply by contacting with water itself. With higher alcohols, particularly those of the aromatic series, hydration of corresponding aldehydes is more difficult. It is here that the additional service of small amounts of hydrative catalysts or salts of the stable hydrative inorganic acids, such as boric and phosphoric acids, with either aliphatic bases here concerned or with hydrative oxides, may find use.

The mechanism of the process is based upon the five stages of equilibria set up during the single passage of alcohol and water through the reaction zone. A molecule of alcohol is first dehydrogenated and the resulting aldehyde is immediately hydrated into an aldehydrol and this latter enters into chemical combination with the basic manganous acetate, basic aluminum acetate, basic chromium acetate, and so forth, even in the presence of free acetic acid; the equilibrium in the system between partially hydrolyzed acetate salt on the one hand and water and free acetic acid on the other makes therefore for just this condition, and unless a new and disturbing factor to such equilibrium is introduced, whatever union takes place between the basic acetate and aldehydrol could be of only transitory existence in view of the constant hydrolytic action of the incoming water vapors. This disturbing factor is here brought into play by way of finely divided dehydrogenative metal presenting surface of contact to aldehydrate-acetate salt momentarily formed. Such state leads to dehydrogenation of the aldehydrate group directly into the acyl group and thus the normal or substantially normal acetate salt is brought into existence. The conditions prevailing for equilibrium at hand demand at once the partial hydrolysis of this normal acetate in order that the equilibrium may again be restored. Excepting at higher pressures and temperatures than are given herein, there is no evidence that combination takes place between the hydrated aldehyde and acid under production.

In general it is found that an efficient catalytic mass comprises two molecular equivalents of a dehydrogenative metal, one-fifth molecular equivalent of each of at least two directive catalysts, and one-tenth molecular equivalent of one or more effective hydrative catalysts, such as magnesium titanate, copper vanadate, aluminum phosphate, cobalt borate, manganese borate.

To more clearly explain the invention examples of particular treatments are given below. It will be noted that in these examples specifically different alcohols were used as starting materials and that in each case satisfactory yields of the corresponding acids were secured.

*Example 1A*

A combustion tube was filled with a catalytic mass prepared by mixing about 50 grams of carefully washed pumice with the hydroxides of copper, manganese and aluminum, in the approximate proportion of 2 gram molecular weights of copper, ⅕ gram molecular weight of manganous oxide, and 1/10 gram molecular weight of aluminum oxide.

The pumice impregnated with these products in the form of hydroxides was now carefully dried and inserted in a combustion tube. Through this combustion tube, which was maintained at about 280° to 300° C., was now passed a current of air until complete oxidation was effected, and subsequently while held at the same temperature a current of hydrogen was passed through until reduction was complete. The vapors of an acetic acid solution, of approximately 20% concentration, was now passed through the combustion tube in order to convert as much of the bases as possible into basic acetates, after which a mixture of 46 grams (1 gram molecular weight) of ethyl alcohol and 18 grams (1 gram molecular weight) of water was passed through the tube, during which passage the tube was heated in such way that the forepart or influx end of the tube indicated a temperature of about 300° C., whereas the efflux end was maintained between 260 and 280° C. During this treatment the speed of operation was adjusted with respect to the temperature at the influx end so that complete dehydrogenation of alcohol was accomplished in one pass. The vapors of the dilute alcohol required about one hour for passage and showed the following analysis (after making allowance for the acetic acid and water that was introduced in the reaction vessel and that retained at the end):

|  | Grams |
|---|---|
| Acetic acid (50% concentration) | 14.5 |
| Acetaldehyde | 32.5 |
| Ethyl acetate | .3 |
| Hydrogen | 2.5 |
| Water | 13.5 |
| Total (approximating the input of 64 grams) | 63.3 |

Upon removing the acetic acid fraction and recycling the acetaldehyde fraction it was found that the proportion of acetic acid to aldehyde appreciably increased and the water diminished with a resultant increase in the concentration of the acid.

*Example 1B*

A slender sillimanite thimble was inserted to a depth of about 20 inches into an ordinary glass combustion tube about 36 inches long and approximately 75/100 of an inch in diameter. The open end of the thimble projecting beyond the tube was connected with a vacuum pump. The combustion tube itself was fitted with connections which permitted the passage of gases through the tube and about the porous thimble. The annular space within the interior of the tube and the exterior of the thimble was filled with the quantity of catalyst prepared as described in Example 1A. The vapors of acetic acid were likewise passed through the contact mass as in Example 1A.

In this example 46 grams (1 gram molecular weight) of ethyl alcohol and 36 grams (2 gram molecular weights) of water was used in order drive the equilibrium reaction as far as possible to the acetic acid side, and a vacuum was placed on the porous thimble to further assist the equilibrium displacement. The temperature of the influx of the tube was maintained at about 300° C. and that of the efflux at from 260 to 280° C. As much as 90% of the hydrogen was accounted for in the effluent gases in the tube and this was of high purity. After making allowance for the acetic acid retained in the catalytic mass, the results were as follows:

| | Grams |
|---|---|
| Acetic acid (52.6% concentration) | 30 |
| Acetaldehyde | 21.5 |
| Ethyl acetate | .3 |
| Hydrogen | 3 |
| Water | 27 |

It was found that by recycling the acid aldehyde portion the concentration of acetic acid was readily increased to approximately 75% concentration.

Example 2A

In this run the conditions of Example 1A were substantially duplicated, except that the $\frac{1}{10}$ gram molecular weight of aluminum oxide was replaced by $\frac{1}{10}$ gram molecular weight of chromic oxide.

Through the contact mass was passed a solution of about 10% N-propionic acid.

A mixture of 60 grams of N-propyl alcohol (1 gram molecular weight) and 18 grams of water (1 gram molecular weight) was passed through the tube. During this passage the temperature of the influx of the tube was maintained at 300° C. and the temperature of the efflux at between 260 and 270° C. The vapors were passed through the tube for a period of one hour. After making allowance for the quantity of propionic acid maintained in the catalytic mass, the results were as follows:

| | Grams |
|---|---|
| N-propionic acid (58% concentration) | 18 |
| N-propionic aldehyde | 13 |
| Propyl-propionate | .3 |
| Hydrogen | 2.5 |
| Water | 13 |
| Total from 78 grams introduced | 7.8 |

Upon recycling the alhehyde portion the concentration of acid was found to be considerably higher.

Example 2B

In this example the apparatus described in Example 1B was employed. In this was contained the catalytic mass employed in Example 2A. A solution of about 10% of N-propionic acid was passed through the tube in the manner previously described. Thereafter, 60 grams of N-propyl alcohol (1 gram molecular weight) and 36 grams of water (2 grams molecular weight) were introduced and hydrogen withdrawn from the tube by operating the vacuum pump. After allowing for the quantity of propionic acid retained in the mass, the products showed the following analysis:

| | Grams |
|---|---|
| N-propionic acid (57.5% concentration) | 36.5 |
| N-propionic aldehyde | 29 |
| Propyl-propionate | .3 |
| Total hydrogen | 3 |
| Water | 27 |

By recycling concentration is increased as heretofore described.

Example 3

In this run the mass consisted of 2 gram molecular weights of copper, $\frac{1}{5}$ gram molecular weight manganous oxide, $\frac{1}{10}$ gram molecular weight aluminum oxide and $\frac{1}{20}$ gram molecular weight titanium oxide, all of these substances being introduced in the form of their hydroxides and subsequently treated as in Example 1A. Through the active mass was passed a dilute solution of N-butyric acid.

74 grams (1 gram molecular weight) of N-butyl alcohol and 18 grams of water (1 gram molecular weight) were passed through this tube, heated as in previous cases, (300° in forepart and from 260 to 280° at exit end of the tube). After calculating, and allowing for the butyric acid retained in the mass, the products gave the following analysis:

| | Grams |
|---|---|
| N-butyric acid (71% concentration) | 29 |
| N-butyric aldehyde | 47.5 |
| Butyl butyrate | .2 |
| Hydrogen | 2.5 |
| Water | 12 |
| Total from 92 grams introduced | 91.2 |

Example 4

In this treatment the catalytic mass as described in Example 3 was employed. Through this mass, heated to temperatures previously described, was first passed a dilute solution of benzoic acid.

Thereafter 108 grams of benzyl alcohol (1 gram molecular weight) and 36 grams (2 gram molecular weights) of water were passed through the apparatus, which was held at about 320° C. Upon analysis, and as in the other cases after making allowance for the quantity of benzoic acid retained in the mass, the products were found to contain almost 11 grams of benzoic acid and .4 gram of hydrogen.

In all of the treatments illustrated by the examples the speed of operation and temperature of the inlet end of the combustion tube were so adjusted that complete dehydrogenation of alcohol was accomplished in a single passage. It will be appreciated, however, that when such dehydrogenation is not complete it can readily be attained by recycling the alcoholic vapors along with the aldehyde formed.

It will be appreciated that within the broad principle of the invention many modifications and adaptations of the process are possible. Thus, in lieu of using a sillimanite tube for the purpose of withdrawing hydrogen from the zone of reaction, other materials which are selectively permeable to hydrogen may be employed. Examples of these are tubes of platinum, palladium, wrought iron, and various alloys, silicon oxide, aluminum oxide (alundum), or partially fused earthy materials, either alone or in admixture with other substances. Furthermore, a suitable trap or vent alone may be made to serve this purpose of hydrogen removal.

It will be observed that during the operations described the rapid withdrawal of hydrogen tends to reduce the pressure below that of atmospheric. This is found in no way to interfere with the reaction but, on the contrary, considerably accelerates it. It is to be understood, however, that the operation may be carried out at higher pressures. At such higher pressures the forcing of the hydrogen through the porous membrane or specially devised vent is facilitated and hence at times the use of higher pressures may be advantageous. It is to be understood, therefore, that the invention comprehends the use of wide ranges of pressures including both sub and super-atmospheric pressures.

It will be appreciated likewise that with proper adjustment the hereindescribed process may be utilized when using specifically different compounds as starting materials. In the examples given the method was described with relation to the dehydrogenation of alcohols followed by the conversion of aldehyde to acid. However, the process is applicable to utilization with any material which, under the agency of water, can be made to yield primary alcohol. Thus, for example, the process may be employed when using ethylene as a starting material. This substance may be hydrated into alcohol and thus adapted directly to the process described. If desired also other olefines or homologues of ethylene may be employed to produce corresponding acids. Similarly acetylene may be used as a starting material which, by double hydration, may be converted to acetaldehyde and this product subjected to hydration and dehydrogenation in the manner described. A great advantage of the described treatment of ethylene and acetylene is that the operations are carried out in the absence of direct oxygen-supplying material and hence eliminates the well-known danger of explosion.

Hence it is to be understood that although preferred treatments have been described, these are given for the purpose of explaining the principles of the invention and are not to be considered the exclusive methods of effectuating these principles. The invention is conceived to reside broadly in the concept of utilizing the improved catalytic mass for effecting the conversion of desired starting materials to organic acids without, however, employing either free oxygen or materials containing readily available oxygen.

I claim:

1. A process of preparing organic acids which comprises contacting alcohol and water, in vapor phase, with a dehydrogenative catalyst and a catalytic mass comprising essentially a partially hydrolyzable salt of an amphoteric base and an organic acid.

2. A process of preparing organic acids which comprises passing alcohol and water, in vapor phase and below 350° C. through a reaction zone containing a dehydrogenative catalyst and a catalytic mass comprising essentially a partially hydrolyzable salt of an amphoteric base and an organic acid.

3. A process of preparing organic acids which comprises dehydrogenating a primary alcohol and contacting the resulting aldehyde with a dehydrogenative catalyst and a catalytic mass comprising essentially a partially hydrolyzable salt of an amphoteric base and an organic acid.

4. A process of preparing organic acids, which comprises contacting alcohol and water, in vapor phase and at temperatures below 350° C., with a catalytic mass which comprises essentially a dehydrogenative catalyst and a salt of an amphoteric base and an organic acid, which mass hydrates the resulting aldehyde and effects the formation of the corresponding acid.

5. A method of preparing organic acids which comprises passing a primary alcohol and water, in vapor phase, in contact with a dehydrogenative catalyst and a partially hydrolyzable salt of an organic acid and one of the metals chosen from the following group; copper, beryllium, magnesium, zinc, aluminum, zirconium, chromium, manganese, iron, cobalt and the cerium metals.

6. A process of preparing an organic acid which comprises passing alcohol and water, maintained at a temperature below 350° C., in contact with a mass comprising essentially a dehydrogenative catalyst, and a salt of an amphoteric base and an organic acid, which salt resists complete hydrolysis below 350° C.

7. A process of preparing organic acids which comprises passing a primary alcohol and water, in vapor phase and below 350° C., in contact with a dehydrogenative catalyst and a partially hydrolyzable salt of an amphoteric base and an organic acid while maintaining a low partial pressure of hydrogen in the reaction zone.

8. A process of preparing organic acids which comprises passing a primary alcohol and water, in vapor phase, below 350° C., in contact with a catalytic mass comprising essentially a dehydrogenative catalyst and a partially hydrolyzable salt of an amphoteric base and an organic acid, immediately withdrawing hydrogen from the zone of reaction, separating acid from the products of conversion and recycling the remainder of such products for retreatment.

9. A process of preparing an organic acid which comprises passing a corresponding alcohol and water, in vapor phase and below 350° C., in contact with a dehydrogenative catalyst and a partially hydrolyzable salt of an amphoteric base and an organic acid, while maintaining the reaction zone under a low partial pressure of hydrogen and substantially free of oxygen.

10. A process of preparing an organic acid which comprises passing a corresponding alcohol and water, in vapor phase and maintained below 350° C., in contact with a contact mass comprising essentially a dehydrogenative catalyst and a partially hydrolyzable salt of an amphoteric base and an organic acid, neither of which contain potentially available oxygen, and withdrawing the acid from the zone of reaction.

11. A process of preparing acetic acid which comprises passing ethyl alcohol and water, in vapor phase and below 350° C., in contact with a catalytic mass comprising essentially a dehydrogenative catalyst and a partially hydrolyzable salt of an amphoteric base and acetic acid, the process being characterized by the absence of free or potentially available oxygen in the reaction zone.

12. A process of preparing propionic acid which comprises passing propyl alcohol and water, in vapor phase and below 350° C., in contact with a dehydrogenative catalyst and a salt of an amphoteric base and a fatty acid, withdrawing propionic acid and propionic aldehyde from the reaction zone and recycling the aldehyde for retreatment.

13. A process of preparing butyric acid which comprises passing butyl alcohol and water, in vapor phase and below 350° C., through a reaction zone and in contact with a dehydrogenative catalyst and a basic metal butyrate, the metal of the acetate salt being chosen from the following group; copper, beryllium, magnesium, zinc, aluminum, zirconium, chromium, manganese, iron, cobalt and the cerium metals.

14. A process of preparing acetic acid which comprises contacting ethyl alcohol and water, in vapor phase, with a catalytic mass which comprises essentially a dehydrogenative catalyst and a partially hydrolyzable salt of an amphoteric base and an organic acid.

15. A process of preparing acetic acid which comprises contacting ethyl alcohol and water, in vapor phase, with a catalytic mass which comprises essentially a dehydrogenative catalyst and a partially hydrolyzable salt of an amphoteric base and acetic acid, withdrawing the products of conversion from the zone of reaction, separating the acid formed from the conversion products and recycling the remaining conversion products.

16. A process of converting alcohols to valuable products which comprises passing ethyl alcohol and water, in vapor phase, in contact with a catalytic mass which comprises essentially a dehydrogenative catalyst and a partially hydrolyzable salt of an amphoteric base and acetic acid; controlling the pressure and temperature conditions of the reaction to insure the formation of acetic acid and ethyl acetate and separately recovering the acetic acid and ethyl acetate.

17. A process of preparing organic acids which comprises contacting a material containing alcohol and water, in vapor phase, with a dehydrogenative catalyst and a catalytic mass which comprises essentially partially hydrolyzable salts of amphoteric bases and organic acids.

18. A process of preparing organic acid from the corresponding primary alcohol which comprises passing the vapors of said alcohol and water over a catalytic mass comprising essentially a dehydrogenative catalyst and a partially hydrolyzable salt of an amphoteric base and an organic acid and maintaining super-atmospheric pressure of vapors within the reaction zone.

19. A process of preparing organic acid from the corresponding primary alcohol which comprises passing the vapors of said alcohol and water over a catalytic mass comprising essentially a dehydrogenative catalyst and a partially hydrolyzable salt of an amphoteric base and an organic acid and maintaining sub-atmospheric pressure of vapors within the reaction zone.

20. A process of preparing organic acids which comprises contacting a primary alcohol and water, in vapor phase, with a dehydrogenative catalyst and a hydrative catalyst, and withdrawing hydrogen from the zone of reaction.

21. A process of preparing organic acids which comprises passing a corresponding primary alcohol and water, in vapor phase, and below 350° C., in contact with a dehydrogenative catalyst and a hydrative catalyst, and immediately withdrawing the hydrogen liberated from the zone of reaction.

22. A process of preparing organic acids which comprises passing an aliphatic alcohol and water, in vapor phase, and below 350° C., in contact with a dehydrogenative catalyst and a hydrative catalyst, immediately withdrawing the hydrogen liberated from the zone of reaction, separating acid from the products of conversion and recycling the remainder of such products of conversion.

23. A process of preparing organic acid which comprises passing a primary aliphatic alcohol and water, in vapor phase, and below 350° C., in contact with a dehydrogenative catalyst and a hydrative catalyst and in sufficient amount to hydrate substantially all of said aliphatic aldehyde as formed, and immediately withdrawing hydrogen liberated during the reaction from the zone of reaction.

24. A process of preparing organic acids which comprises contacting a primary alcohol and water, in vapor phase, and below 350°, with a dehydrogenative catalyst and a hydrative catalyst, the hydrative catalyst being in an amount sufficient to hydrate substantially all of the aldehyde formed by dehydrogenation of the said primary alcohol, and the dehydrogenative catalyst being in sufficient amount to dehydrogenate the hydrated aldehyde as well as the alcohol.

25. A process of preparing organic acids which comprises contacting a primary alcohol and water, in vapor phase, and below 350° C., with a dehydrogenative catalyst and a hydrative catalyst, the hydrative catalyst being in an amount sufficient to hydrate substantially all of the aldehyde formed by dehydrogenation of the alcohol, and the dehydrogenative catalyst being in sufficient amount to dehydrogenate the hydrated aldehyde as well as the alcohol, and continuously withdrawing the hydrogen liberated from the reaction zone.

26. A process of preparing organic acids from primary alcohols which comprises contacting an alcohol and water, in vapor phase, with a catalytic mass including essentially a dehydrogenative catalyst and a hydrative catalyst, and withdrawing hydrogen liberated during the reaction, from the reaction zone.

27. A process of preparing organic acids from primary alcohols which comprises contacting alcohol and water, in vapor phase, and at temperatures below 350° C., with a catalytic mass including essentially a dehydrogenative catalyst and a hydrative catalyst, withdrawing hydrogen from the reaction zone, separating the acid produced from the products of conversion, and recycling unconverted aldehyde to the reaction zone for retreatment.

WILLIAM J. HALE.